United States Patent [19]
Druge et al.

[11] 3,823,810
[45] July 16, 1974

[54] DEVICES FOR HANDLING WORKPIECES BY MEANS OF CENTERLESS HOLDERS

[75] Inventors: Gerard Druge, Annecy; Claude Valentini, Billancourt, both of France

[73] Assignee: Societe Nouvelle De Roulements, Annecy (Haute Savoie), France

[22] Filed: Jan. 26, 1973

[21] Appl. No.: 326,781

[30] Foreign Application Priority Data
Feb. 2, 1972  France..........................72.03463

[52] U.S. Cl. ............................. 198/26, 214/1 PB
[51] Int. Cl. ............................. B65g 47/00
[58] Field of Search .......... 214/1 P, 1 PZ; 221/225, 221/238, 224; 198/26, 218, 214

[56] References Cited
UNITED STATES PATENTS
1,700,697  1/1929  Draper ............................ 214/1 P
FOREIGN PATENTS OR APPLICATIONS
87,978  7/1956  Norway ............................ 214/1 P Primary Examiner—Richard E. Aegerter
Attorney, Agent, or Firm—Stevens, Davis, Miller & Mosher

[57] ABSTRACT

This device for feeding, loading and discharging workpieces by loading them rotatably and centerlessly utilizes peripheral holding members of which at least one is movable for performing the loading step and constitutes the lower support of the workpiece, mounted on a movable unit displaceable along an abutment acting as a ramp for lifting the workpieces from a reception position to a loading position; this movable unit acts at the same time as a ramp for lowering the workpieces between its holding members after clearing said feed ramp, the path along which said movable holding member is caused to travel diverging from the path along which the workpieces are discharged by gravity, in order to permit this discharge.

8 Claims, 4 Drawing Figures

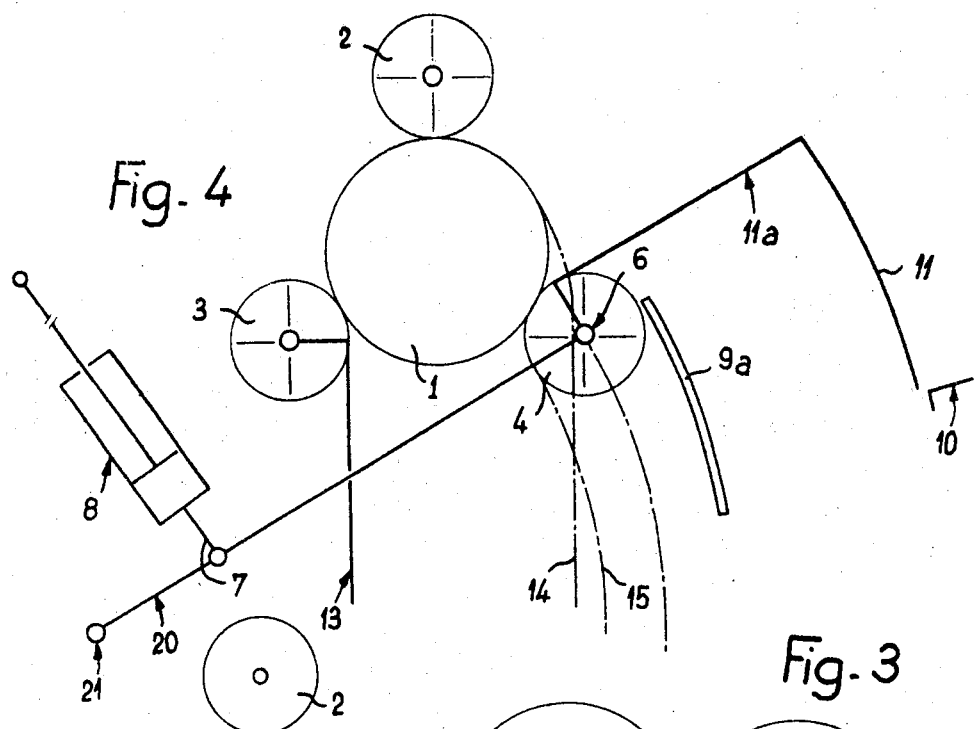
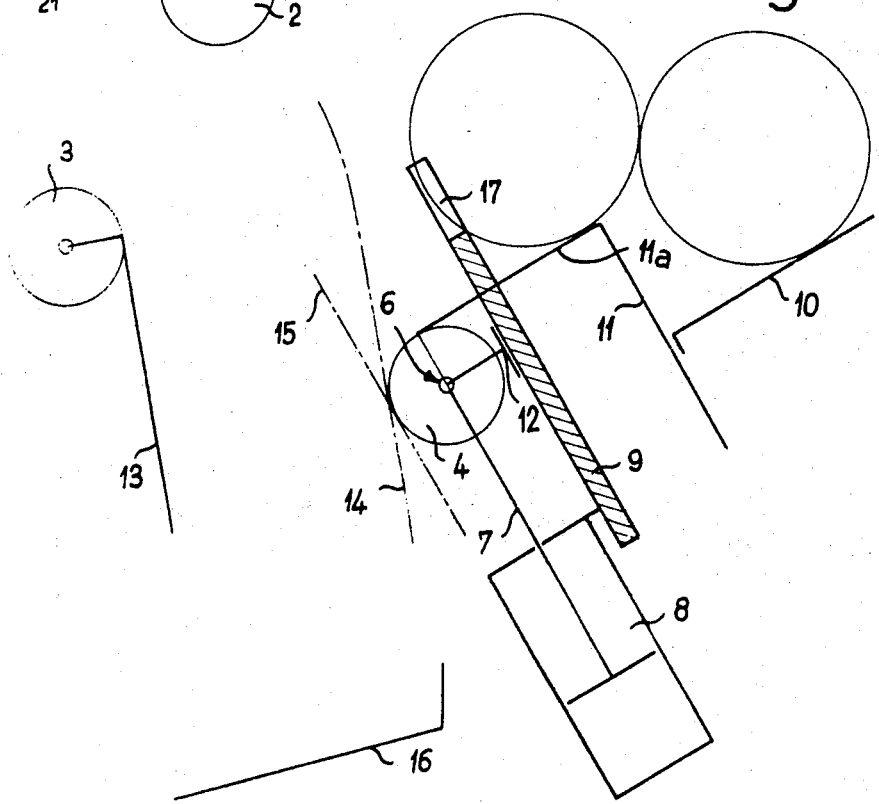

DEVICES FOR HANDLING WORKPIECES BY MEANS OF CENTERLESS HOLDERS

The present invention relates to workpiece handling devices and has specific reference to means for feeding, loading and discharging workpieces by means of a centerless loading unit comprising peripheral holding members of which at least one is movable in order to perform the loading step.

In comparison with the many known arrangements devised for performing the same functions, the present invention provides a device having the following advantages:
a simple construction requiring inter alia only one power member;
the device operates very rapidly with a reciprocating motion, and
the adjustment as a function of the size of the workpieces to be handled is extremely simple.

Basically, the device according to this invention and as broadly disclosed hereinabove, is characterised in that said movable holding member constituting the lower workpiece support, is carried by a unit movable along an abutment member acting as a feed ramp for transferring the workpieces from a workpiece receiving position to a loading position, said movable unit constituting at the same time a ramp for lifting the workpieces along said feed ramp, and a ramp for lowering said workpieces between the holding members after clearing said feed ramp, the path of the movement accomplished by said movable holding member diverging from the path followed by the workpieces when these are discharged by gravity, in order to permit said discharge to take place during the travel of said movable holding member towards said position where the workpieces are received by said movable unit.

Two typical forms of embodiment of this device will now be described by way of example with reference to the attached drawings, in which:

FIG. 3 is a similar view showing the supply of a fresh workpiece following the discharge of the preceding workpiece; and FIG. 4 is a diagrammatic view of a modified form of embodiment of the device of this invention.

Figure 1:
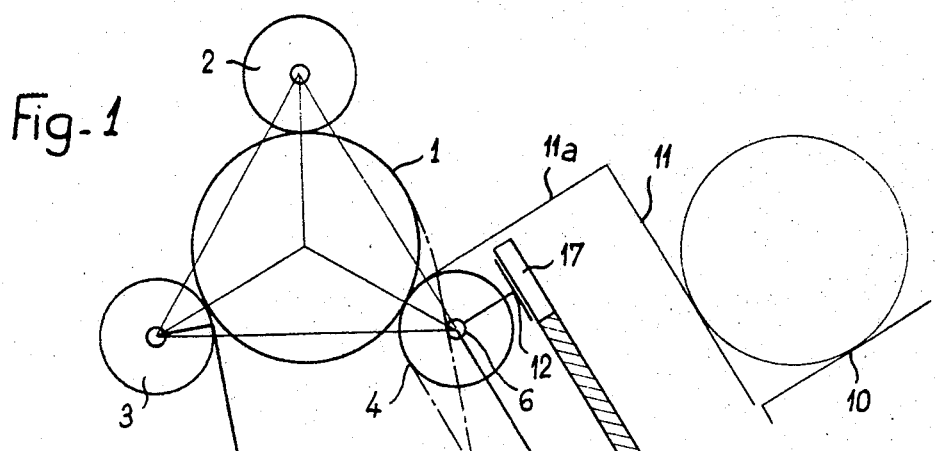
FIG. 1 is a diagrammatic illustration of the device, with the workpiece shown in its machining position.

As shown in FIG. 1, the workpiece 1 is loaded in this example between three loose rollers 2, 3 and 4. Roller 2 is normally stationary with respect to the frame structure of the device (not shown), irrespective of the diameter of the workpiece 1 to be machined. This roller 2 may be the driving or power roller adapted to transmit its motion to the workpiece 1. The next roller 3 is movable along the line of centres of rollers 2 and 3 so that it can be set as a function of the diameter of the workpiece 1. This roller 3 may also be a power roller rotating in synchronism with the first roller 2, or simply a loose roller, i.e., rotating freely about its axis and therefore driven by the workpiece 1. The last roller 4 is mounted for loose rotation on a strap carried by the end 6 of a movable unit comprising the piston rod 7 of a fluid-operated actuator 8 secured to an angle member 9 adjustable with respect to said frame structure in the direction of the line of centres of rollers 2 and 4, and acting as an abutment and ramp member for feeding the workpieces.

The workpiece thus carried along and positioned between the rollers 2 and 3, and pressed by the actuator 8 through the roller 4, can be machined (for example by grinding, honing or high-polishing or finishing operations).

The next workpieces are stored in an inclined chute 10 in which they roll downwards by gravity, the leading workpiece bearing against a portion 11 of the movable unit constituting the stopping abutment element.

During the machining operation proper the workpiece 1 engages in the known fashion a fixed or movable lateral reference surface, due to a slightly oblique position of the rollers. The reaction exerted by this workpiece 1 on the last roller 4 is supported by a shoe 12 bearing in turn against said supporting angle member 9. Thus, no lateral stress is exerted on the piston rod 7.

Figure 2:
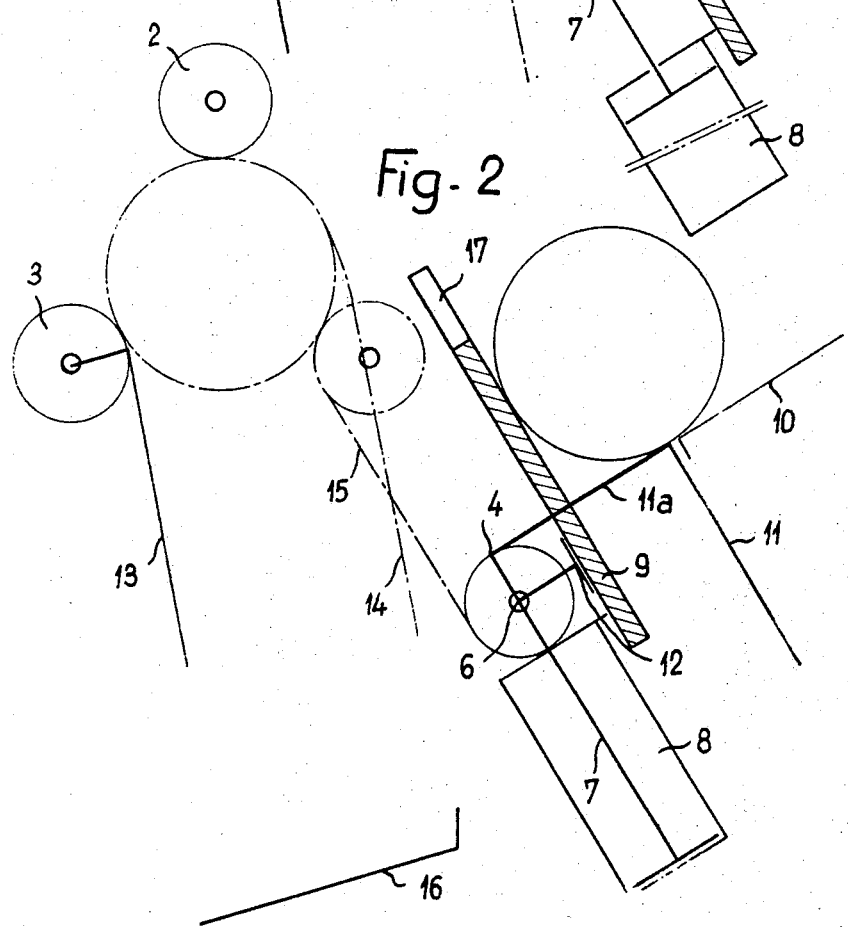
FIG. 2 is a similar view showing the discharge of the workpiece.

In FIG. 2 the device is shown in the workpiece discharge position.

The pressure inverted by the actuator 8 permits the backward movement of its piston 7 and therefore of the roller 4 carried thereby. The workpiece 1 follows this roller 4 while engaging firstly the rollers 3 and 4, then the roller 4 and the deflector 13 fulcrumed about the axis of roller 3 and secured to the frame structure.

When the envelope path 14 of workpiece 1, during the downward movement of this workpiece, intersects the envelope path 15 of roller 4, the workpiece 1 drops by gravity into the discharge shoot 16.

Since the abutment element 11 has receded jointly with roller 4, it becomes eventually level with the feed chute 10 and consequently the workpiece 1 moves towards the angle member 9 on the portion 11a of the movable unit which constitutes the ramp for lifting the workpieces during the feed step.

In FIG. 3 the device is shown during the return stroke of the piston rod 7, i.e., the feed stroke thereof. During the upward stroke of this piston the aforesaid portion 11a lifts the workpiece 1 waiting for the next feed step. When the envelope paths 14 and 15 intersect each other, i.e., when the escape is closed, the next workpiece 1 registers with a notch 17 formed in said angle member 9 and then rolls on the portion 11a constituting the downward ramp between the rollers, and eventually engages the roller 4 and the deflector 13. The roller 4, as it continues its upward movement, carries along the workpiece and the latter is subsequently positioned between the three rollers 2, 3 and 4 in the machining position; thus, the workpiece is driven and the complete discharge and feed cycle is ended.

FIG. 4 corresponds to a modified form of embodiment of the device wherein the roller 4 is mounted in a strap carried by the end of an arm 20 pivoted to an end pin 21. This arm 20 is responsive to a linear actuator 8, but a rotary actuator may also be used to this end, if desired. The roller 4 is also in this case displaceable along a member acting as an abutment and a workpiece feeding member 9a.

The mode of operation of this modified structure is exactly the same as that of the first form of embodiment, except that the shoe 12 provided in the preceding case for absorbing the reaction of roller 4 on workpiece 1 can be dispensed with, this function being devolved to the arm 20.

The preliminary setting is also simplfied in the arrangement of FIG. 4 since only the abutment and feed ramp 9a and the deflector 13 are to be adjusted if workpieces having a different diameter are to be handled. On the other hand, this mechanism is better protected against the trickling or running of cutting fluids and the fall of metal chips or abrasive particles. Besides, the angles formed between the generatrices of the rollers at their points of engagement with the workpiece surface, when loading this workpiece, will vary according to the workpiece diameter.

The advantages arising from the present invention may be summarized as follows:

there is a single power member, thus simplifying considerably the driving system, without any problem in connection with synchronization.

The feeding, loading and discharge cycle is extremely fast, since it consists simply of a single reciprocation of the control member.

Highly simplified setting, since in case of change from one workpiece diameter to another, it is only necessary to adjust the roller 3 and therefore, automatically, the deflector 13, and finally the feed abutment and ramp element 9 or 9a.

Although the device is shown by way of example as comprising a gravity-operated feed shoot, it will readily occur to those conversant with the art that other feed systems may be used, notably for supplying workpieces seaprately to the position shown in FIG. 2, for example by using a transverse shoot (i.e., extending at right angles to the plane of the figure) in which the workpieces are fed to this position and stopped thereat by engaging a lateral stop member.

Although two specific forms of embodiment of this invention have been described hereinabove and illustrated in the accompanying drawing, it will readily occur to those skilled in the art that various modifications and changes may be brought thereto without departing from the scope of the invention as set forth in the appended claims.

What is claimed as new is:

1. An apparatus for feeding, loading and discharging workpieces comprising:
   a plurality of peripheral holding members, at least one of said holding members being movable,
   means for moving said movable holding member between first and second positions for feeding and loading a workpiece, respectively, said moving means including a movable support member for supporting said workpiece between said feeding and said loading positions, said support member further including guide means for guiding said workpiece from a loading position to a further position in which said workpiece is held by said plurality of peripheral holding members; and
   an elongated abutment member disposed adjacent to and extending at least partially along the path of travel of said movable holding member to act as a guide during movement of said workpiece between said feeding and loading positions.

2. The apparatus according to claim 1, further comprising means for guiding said workpiece to said feeding position, including an inclined guide member having a ramp surface which forms a preceding extension of said movable support member in said feeding position of said moving means; and wherein said moving means includes a further abutment means for preventing movement of a workpiece from said inclined guide member to said support member in said loading position of said moving means.

3. The apparatus according to claim 1, wherein said plurality of peripheral holding members comprises three rollers and said movable holding member comprises one of said rollers.

4. The apparatus according to claim 1, wherein said moving means further comprises an actuator member having a path of travel substantially parallel to said abutment member and a bearing member disposed to engage said abutment member.

5. The apparatus according to claim 4, wherein said path of travel of said actuator member is a substantially linear path comprising an extension of a path defined between the centers of said movable holding member and a further one of said plurality of holding members.

6. The apparatus according to claim 1, wherein said moving means further comprises an actuator member mounted for pivotal movement thereof about a fixed center point, said actuator member being coupled to said movable holding member for moving said movable holding member through an arcuate path between said feeding and loading positions.

7. The apparatus according to claim 6, wherein said elongated abutment member is arcuately shaped with a center of curvature substantially coinciding with the center of pivoting movement of said actuator member.

8. The apparatus according to claim 1, wherein said elongated abutment member includes an aperture portion located adjacent said loading position for guiding said workpiece toward said position in which said workpiece is held in said holding members.

* * * * *